United States Patent Office 3,529,039
Patented Sept. 15, 1970

3,529,039
ACRYLONITRILE GRAFT POLYMERS
Heinrich Rinkler and Gunther Nischk, Dormagen, Germany, assignors to Farbenfabriken Bayer Aktiengesellschaft, Leverkusen, Germany, a corporation of Germany
No Drawing. Filed Feb. 13, 1968, Ser. No. 705,003
Claims priority, application Germany, Feb. 17, 1967, F 51,559
Int. Cl. C08f 29/56
U.S. Cl. 260—898
9 Claims

ABSTRACT OF THE DISCLOSURE

This invention relates to acrylonitrile graft polymers comprising (a) acrylonitrile and optionally a further copolymerizable monomer in polymerized form and (b) a graft substrate consisting of a polyalkylene glycol sulfoalkyl ether. Furthermore this invention relates to a process for preparing said acrylonitrile graft polymers having a high affinity to basic dyes and an outstanding thermal stability by polymerizing acrylonitrile—optionally together with a further copolymerizable monomer—in the presence of a polyalkylene glycol sulfoalkyl ether as a graft substrate, said polymerizing being effected in an aqueous medium in the presence of a radical forming catalyst.

---

This invention relates to acrylonitrile graft polymers with a high affinity for basic dyes and to a process for their production by grafting acrylonitrile onto polymeric compounds in aqueous solution.

Filaments and yarns produced from acrylonitrile homopolymers and copolymers of acrylonitrile with neutral comonomers do not always show an affinity for dyes which is sufficient to satisfy practical requirements.

Attempts have already been made to graft acrylonitrile on polymers with a view to increasing the affinity of polyacrylonitrile and acrylonitrile copolymers for basic dyes. Unfortunately, the polymers show a pronounced tendency to discolour at elevated temperatures. It is also known that acrylonitrile may be grafted, either on its own or in conjunction with other monomers, onto polyalkylene oxides such as polyethylene oxide or polypropylene oxide. The polymers thus obtained do not, however, show an improved affinity for dyes.

It is an object of this invention to provide acrylonitrile graft polymers comprising (a) at 55 percent by weight of acrylonitrile and up to 45 percent by weight of another polymerizable monoolefinic monomer copolymerizable therewith in polymerized form and (b) 5 to 30 percent by weight of a graft substrate consisting of a polyalkylene glycol sulfoalkylether, the polyalkylene glycol having a molecular weight of 400 to 5000.

It is a further object of the invention to provide acrylonitrile graft polymers with an acrylonitrile content of at least 55% and a particularly high affinity for basic dyes, coupled with outstanding thermal stability prepared by a process in which acrylonitrile is polymerised, optionally together with a further monomer or monomers, in aqueous medium in the presence both of linear or branched polyalkylene glycols terminally etherified by alkylene sulphonic acids, and in the presence of radical-forming catalysts.

The polyalkylene glycol sulphoalkyl ethers may be obtained by reacting aliphatic sultones with the terminal hydroxy groups of polyalkylene oxides. Suitable polyglycols having a molecular weight in the range from 400 to 5000—preferably from 1000 to 3000—include for example linear polyethylene glycols, polypropylene glycols, polytetrahydrofurans and branched polyglycols of the kind that are obtained, for example, by reaction of trimethylol propane, pentaerythritol, triethanolamine or glycerol with ethylene oxide or propylene oxide.

The quantity in which the polyalkylene glycol sulphoalkyl ethers are employed as graft base in the reaction medium is governed not only by the purpose for which the end products are to be used, but also by the type of polymerisation and by the catalysts used for grafting on the acrylonitrile. When the acrylonitrile is polymerised in aqueous medium, Redox catalyst systems (for example persulphate/bisulphite) giving terminal groups which react with cationic dyes, will generally be used.

If it is intended to use the graft polymers for the production of fibres and filaments, it is sufficient to use, as the graft base, only 5 to 12% by weight of the sulphonated polyalkylene oxides, based on the monomers to be polymerised, in order to provide the level of affinity for dyes generally required for practical purposes. In order to provide special effects, for example a particularly marked increase in the hydrophilic properties or the swellability of the polymers, the graft base may be used in quantities of up to 3% by weight.

The graft polymerization of acrylonitrile on polyalkylene glycol sulphoalkyl ethers is preferably carried out in the presence of a further copolymerisable unsaturated compound or compounds. Compounds such as these include inter alia acrylates and methacrylates; vinyl esters such as vinyl acetate; styrene and its neutral derivatives; vinyl chloride; vinylidene chloride; vinyl bromide; acrylamides and methacrylamides; vinyl alkyl ketones and vinylidene cyanide.

The solubility of the polymers may be increased very considerably, and the behaviour of the fibres with respect to dyes improved equally considerably, by the graft polymerisation of a third comonomer for example methyl acrylate, methyl methacrylate or vinyl acetate. The aforementioned comonomers may be present in the polymer in quantities from 2 to 20% by weight and preferably in quantities from 5 to 7% by weight. In order at the same time to reduce flammability, vinylidene chloride may be added as graft component in quantities from 30 to 45% by weight.

Both the aqueous polymerisation and the grafting are preferably carried out in the presence of water-soluble radical forming catalysts or catalyst systems. Suitable catalyst systems include inorganic or organic peroxidic compounds and azo compounds. It is preferred, however, to use a redox systems and in particular those based on peroxidic compounds and compounds of sulphur in low oxidation stages. The water-soluble salts of peroxydisulphuric acid, for example potassium, sodium or ammonium sulphate are preferably used as the peroxidic compounds in the redox systems. Sulphur dioxide, alkali metal hydrosulphites, alkali metal pyrosulphites, and alkali metal thiosulphates are examples of suitable reduction components. The catalysts are conveniently used in quantities from 0.5 to 5% by weight, based on the total weight of the monomers. The ratio between oxidising and reducing agents in the redox system may be from 2:1 to 1:50, although it is preferably from 1:2 to 1:10.

The unsaturated compounds are polymerised by conventional continuous or batch wise processes. Desalted water used is employed in a weight approximately 5 to 10 times that of the components used. The bath temperature is governed by the type of catalyst and monomers used and may lie in the range from 20 to 90° C., although polymerisation and grafting are preferably carried out at temperatures in the range from 40 to 65° C.

Generally, the polyalkylene glycol sulphoalkyl ethers are dissolved in the aqueous medium, the resulting solution is heated to the polymerisation temperature and the monomer or mixture of several monomers to be grafted on is introduced with the catalyst, either gradually or in a single batch, at a pH-value of from 1 to 6 and preferably from 1 to 4, or alternatively the catalyst or catalyst mixture is subsequently introduced. It is of advantage to complete the polymerisation reaction in an inert gas atmosphere (for example nitrogen). The graft polymers formed are separated from the liquid phase by filtration or centrifuging, washed with desalted water and dried at reduced pressure or in a stream of hot air.

The sulphonic acid groups present in the graft polymers produced in accordance with the present invention provide the polymers with an extremely high affinity for basic dyes. In addition, the graft polymers according to the invention are considerably more hydrophilic than pure polyacrylonitrile or copolymers of acrylonitrile. Solutions prepared from the graft polymers (for example in dimethyl formamide or dimethyl sulphoxide) show outstanding thermal stability, are clear and gel-free and may be spun without any difficulty.

The following examples illustrate more particularly the invention.

EXAMPLES 1-7

Polyalkylene glycol with a molecular weight of from 400 to 5000 is reacted over a period of 15 to 24 hours with an equivalent quantity of 1,3-propane sultone or 1,4-butane sultone, based on the free hydroxy groups in the polymer, to form the corresponding sulphoalkyl ether.

30 parts by weight of polyalkylene glycol sulphoalkyl ether are added to 4000 parts by weight of desalted water in a three-necked flask, and 255 parts by weight of acrylonitrile and 15 parts by weight of acrylic acid methyl ester are polymerised therewith at 50–55° C. with an initiator mixture of 1.9 parts by weight of potassium persulphate and 7.6 parts by weight of sodium metabisulphite. After a polymerisation time of 4 to 5 hours at 55–60° C., the polymer is filtered off, washed thoroughly with desalted water and dried at 50° C. The yield of polymer and its K-value (according to Fikentscher, Celluloschemie 13, page 58, 1932) are both determined and are set out in the following Table 1.

TABLE 1

| Example (graft polymer) | Polyalkylene glycol | Mols of aliphatic sultone co-reacted | Polymer yield (percent) | K-value |
|---|---|---|---|---|
| 1 | Polyethylene glycol molecular weight 1,550. | 2 mols 1,4-butane sultone. | 87 | 84.5 |
| 2 | Polyethylefe glycol molecular weight 2,000. | 2 mols 1,3-propane sultone. | 89 | 83.0 |
| 3 | Polytetrahydrofuran molecular weight 2,095. | do | 85 | 81.0 |
| 4 | Trifunctional propylene glycol molecular weight 3,000. | 3 mols 1,3-propane sultone. | 83 | 82.5 |
| 5 | Polyalkylene glycol (based on trimethylol propane and ethylene oxide) molecular weight 1,380. | do | 87 | 85.0 |
| 6 | Polyalkylene glycol (based on trimethylol propane and ethylene oxide) molecular weight 2,550. | do | 86 | 81.0 |
| 7 | Polyalkylene glycol (based on triethanolamine and ethylene oxide) molecular weight 1,340. | 4 mols 1,3-propane sultone. | 89 | 86.0 |

The sulphonic acid groups incorporated in the polymer were estimated by potentiometric titration in dimethyl formamide solution by treating 1 g. of polymer in 100 ml. of dimethyl/formamide with a mixed-bed ion exchanger and then with a strongly acid ion exchanger, followed by titration with 0.01 N methanolic potassium hydroxide.

A pH-meter of the kind manufactured by Messrs. Knick (Type 52, calomel glass electrode) was used as the measuring instrument.

The results are set out in the following Table 2 as milliequivalents acid groups/1000 g. of polymer. In addition, the increased affinity of the graft polymers for dyes can be demonstrated by dyeing films prepared from the polymers with basic dyes. The films are prepared from a 15% by weight dimethyl formamide solution in a layer thickness of approximately 50μ, washed free of solvent and dyed with Astrazonblau B (Colour Index 2nd ed., vol. 111, No. 42140) for 1 hour at boiling temperature in a dye bath of the following composition:

|   | Ml. |
|---|---|
| Astrazonblau-B (Colour Index 1, 2nd ed., 1640) (1 g./l.) | 100.0 |
| Acetic acid (30 g./l.) | 2.0 |
| Sodium acetate (40 g./l.) | 0.3 |

The quantity of dye absorbed is measured by dissolving the dyed films in dimethyl formamide containing 1 g. of sulphuric acid per litre. The weight of dye absorbed in grams per gram of film is determined with the aid of a photometer and calibration curve. An acrylonitrile homopolymer (K-value 86) was used for comparison:

TABLE 2

| Polymer of Example No. | mVals. acid groups, 1,000 g. polymer | G. of dye/ g. of film |
|---|---|---|
| 1 | 103.5 | $1.6 \cdot 10^{-2}$ |
| 2 | 92.0 | $1.53 \cdot 10^{-2}$ |
| 3 | 87.4 | $1.24 \cdot 10^{-2}$ |
| 4 | 79.5 | $1.17 \cdot 10^{-2}$ |
| 5 | 133.2 | $1.98 \cdot 10^{-2}$ |
| 6 | 111.0 | $1.71 \cdot 10^{-2}$ |
| 7 | 171.5 | $3.1 \cdot 10^{-2}$ |
| Comparison | 23.0 | $0.23 \cdot 10^{-}$ |

What we claim is:

1. An acrylonitrile graft polymer comprising in polymerized form (a) at least 55 percent by weight of acrylonitrile and up to 45 percent of another polymerizable monoolefinic monomer copolymerizable therewith and (b) 5 to 30 percent by weight of a graft substrate consisting of a polyalkylene glycol sulfoalkyl ether, the polyalkylene glycol having a molecular weight of 400 to 5000.

2. The acrylonitrile graft polymer of claim 1, wherein said polymerizable monoolefinic monomer copolymerizable with acrylonitrile is acrylic acid methyl ester.

3. The acrylonitrile graft polymer of claim 1, wherein said graft substrate is polyethylene glycol-sulfobutyl ether.

4. The acrylonitrile graft polymer of claim 1, wherein said graft substrate is polyethylene glycol-sulfopropyl ether.

5. The acrylonitrile graft polymer of claim 1, wherein said graft substrate is polyethylene glycol-sulfopropyl ether prepared from triethanolamine, ethylene oxide and 4 mols of 1,3-propane sultone.

6. A process for the production of readily dyeable acrylonitrile graft polymers which comprises polymerising acrylonitrile, together with up to 45% of a further copolymerisable monoolefinic monomer in an aqueous medium in the presence of a polyalkylene glycol sulfoalkyl ether and of a radical-forming catalyst.

7. The process as claimed in claim 6, wherein the monomers are present in the unpolymerized mixture within the following ranges of percentage proportions by weight acrylonitrile 55 to 100% and the further copolymerizable monomer 0 to 45%.

8. The process as claimed in claim 6, wherein graft polymerizing is carried out in aqueous medium at a pH-value from 1 to 6 in the presence of a redox catalyst system consisting of a persulphate and a sulphur compound in a low oxidation state.

9. The process as claimed in claim 6, wherein the weight ratio of polyalkylene glycol sulphoalkyl ether used as graft substrate to the grafted monomers is in the range of from 5:95 to 30:70.

References Cited
UNITED STATES PATENTS

| | | | |
|---|---|---|---|
| 3,384,682 | 5/1968 | Erchak | 260—874 |
| 3,341,627 | 9/1967 | Wilkinson | 260—898 |

SAMUEL H. BLECH, Primary Examiner

C. J. SECCURO, Assistant Examiner

U.S. Cl. X.R.

260—874, 881, 899, 901; 8—162, 177; 260—607, 79.3